(12) United States Patent
Hou et al.

(10) Patent No.: US 7,092,493 B2
(45) Date of Patent: Aug. 15, 2006

(54) METHODS AND SYSTEMS FOR PROVIDING LAWFUL INTERCEPT OF A MEDIA STREAM IN A MEDIA GATEWAY

(75) Inventors: Hao Hou, Plano, TX (US); Yong He, Plano, TX (US); Tuan Minh Nguyen, Arlington, TX (US); Ahmed Doleh, Plano, TX (US)

(73) Assignee: Santera Systems, Inc., Plano, TX (US)

( * ) Notice: Subject to any disclaimer, the term of this patent is extended or adjusted under 35 U.S.C. 154(b) by 189 days.

(21) Appl. No.: 10/676,234

(22) Filed: Oct. 1, 2003

(65) Prior Publication Data

US 2005/0076117 A1    Apr. 7, 2005

(51) Int. Cl.
*H04M 1/24* (2006.01)
*H04M 3/08* (2006.01)
*H04M 3/22* (2006.01)

(52) U.S. Cl. ............... 379/35; 379/32.01; 379/32.04; 379/32.05

(58) Field of Classification Search .............. 379/7, 379/32.01, 32.02, 32.03, 32.04, 32.05, 35, 379/201.01, 213.01; 455/416, 417; 370/493, 370/494, 495
See application file for complete search history.

(56) References Cited

U.S. PATENT DOCUMENTS

| 6,765,931 | B1  |    | 7/2004  | Rabenko et al. |         |
|-----------|-----|----|---------|----------------|---------|
| 6,870,905 | B1  | *  | 3/2005  | Pelaez et al.  | 379/35  |
| 2002/0051518 | A1 | * | 5/2002 | Bondy et al.    | 379/35  |
| 2003/0174695 | A1 | * | 9/2003 | Lautenschlager et al. | 370/352 |
| 2004/0157629 | A1 | * | 8/2004 | Kallio et al.   | 455/466 |
| 2004/0165709 | A1 | * | 8/2004 | Pence et al.    | 379/201.01 |
| 2004/0192294 | A1 |   | 9/2004 | Pan et al.      |         |
| 2004/0228336 | A1 |   | 11/2004 | Kung et al.    |         |
| 2004/0228362 | A1 | * | 11/2004 | Maki et al.    | 370/467 |
| 2004/0235477 | A1 |   | 11/2004 | Picha et al.   |         |
| 2005/0048973 | A1 |   | 3/2005  | Hou et al.     |         |

OTHER PUBLICATIONS

Cuervo et al., "Megaco Protocol Version 1.0," Network Working Group, http://www.ietf.org/rfc/rfc3015.txt?number=3015, pp. 1-78 (Nov. 2000).

* cited by examiner

*Primary Examiner*—Quoc Tran
(74) *Attorney, Agent, or Firm*—Jenkins, Wilson, Taylor & Hunt, P.A.

(57) ABSTRACT

Methods and systems for providing lawful intercept of a media stream in a media gateway include establishing a call context between a first termination and a second termination and establishing a tap context with at least one tap termination, which refer to the first termination. The call context defines a call media stream between the first and second terminations associated with a call between first and second end users. The tap context defines at least one tap media stream from the first termination to the at least one tap termination. The tap media stream is a one-way media stream that carries either the mouth portion of the call media stream, the ear portion of the media stream, or a combination of the mouth and ear portions of the media stream from the first termination to the at least one tap termination. Multiple tap contexts can be created to support the lawful intercept of the call by multiple law enforcement agencies.

34 Claims, 7 Drawing Sheets

METHODS AND SYSTEMS FOR PROVIDING LAWFUL INTERCEPT OF A MEDIA STREAM IN A MEDIA GATEWAY

TECHNICAL FIELD

The present invention relates to methods and systems providing for the lawful intercept of communication signals. More particularly, the present invention relates to methods and systems for lawfully intercepting a media stream in a media gateway.

BACKGROUND ART

Court-authorized access to telephone communications is an important tool for effective law enforcement. The introduction of new, digitally-based technologies, transmission modes, services, and features have made it increasingly difficult for law enforcement to conduct court-authorized electronic surveillance. Tapping calls in packet-based communication networks is particularly difficult because communication channels may be dynamically provisioned, such that there is no static line to tap, and because subscribers frequently move from one service provider to another. In packet-based communications networks, a media gateway is a network entity that switches media stream communications between its input and output ports and may translate the media stream from one format to another format. Media gateways do not participate in call signaling and consequently do not maintain call state information. A media gateway controller performs signaling functions to establish and tear down calls across media gateways.

One problem with lawfully intercepting communications in conventional media gateways is that the protocols used to control connections in media gateways fail to provide an easily scalable mechanism for intercepting a media stream. For example, the MEGACO protocol, as described in ITU-T Recommendation H.248, includes commands for establishing and modifying contexts in a media gateway. A context is analogous to a call or a communications session between one or more parties. In a media gateway, a context is defined by its endpoints, referred to as terminations. Typically, a context has two terminations in the media gateway—one for communications to and from one party and one for communications to and from another party. The context also defines the direction of the communication, or media stream, between the terminations.

FIG. 1 is a block diagram of a call context 100 having a lawful intercept through a media gateway modeled after a traditional three-way calling configuration. In FIG. 1, the call context includes a bidirectional media stream 102 between Termination A 104 and Termination B 106 in a media gateway 107. The media stream 102 carries media traffic between Termination A 104 and Termination B 106 and allows end users to communicate normally. A third termination, Intercept A 108, is added to the context to accommodate authorized monitoring of the media stream 102 by law enforcement. A TDM matrix 109 switches the media stream 102, 110 between the terminations. Normally, in a three-way call, the media stream between each termination is bi-directional. However, it is desirable for the media stream 110 toward Intercept A 108 to be one-way to prevent sound that might lead to the detection of Intercept A from being received by the other terminations. Thus, the media stream 110 toward Intercept A 108 is configured as a one way only stream to allow law enforcement to monitor the call without interference.

The MEGACO protocol provides for a topology descriptor, which is used to specify flow directions between terminations in a context. The default topology of a context is that each termination's transmission is received by all other terminations. Changing the association between terminations changes the topology of a context. Thus, to implement a lawful intercept using the topology descriptor, the lawful intercept media streams should be configured as one-way toward the law enforcement monitoring termination.

A shortcoming of this arrangement becomes apparent if more than one law enforcement agency is intercepting the media stream. As shown in FIG. 2, three intercept terminations 108 have been added to the call context to accommodate interception by three different agencies. Changes made to the call impact each termination in the context. For example, if the end user on Termination A 104 wishes to add another termination to establish a three-way conversation or if one of the law enforcement agencies wishes to cease its interception of the call, the topology descriptor in the call context would need to be updated, which involves several steps of MEGACO commands. This can be a cumbersome management task and may result in delays in establishing or terminating calls. Moreover, the media gateway may limit the number of terminations permitted in a call context. The limitation on terminations may limit the number of lawful intercepts that could be applied and may altogether prevent the application of a lawful intercept.

Accordingly, there is a need to provide a mechanism to permit the lawful intercept of a call while minimizing the increased load on call management resources.

SUMMARY OF THE INVENTION

According to one aspect, the present invention includes a method for providing lawful intercept of a media stream in a media gateway. The method includes establishing a call context between a first termination and a second termination. The call context defines a call media stream between the first and second terminations associated with a call between first and second end users. The method also includes establishing a tap context, which contains at least one tap termination. The at least one tap termination refers to the target termination (first termination). The tap context defines a one-way media stream that carries a portion of the call media stream from the first termination to the tap termination.

According to another aspect, the present invention includes a media gateway with lawful intercept capability. The media gateway includes a plurality of network interfaces for sending and receiving media streams to and from external networks. A plurality of voice processing resources are operatively associated with the network interfaces for processing the media streams received from the external networks. A controller is operatively associated with the network interfaces and the voice processing resources for controlling the network interfaces and the voice processing resources to establish a call context in the media gateway for a call between first and second end users. The controller, in response to a request for a lawful intercept of the call, controls the network interfaces and the voice processing resources to establish a tap context. The tap context includes at least one tap termination, which refers to one of the first and second terminations.

According to another aspect, the present invention includes a system for providing lawful intercept of a media stream in one or more media gateways. The system includes a media gateway controller for generating media gateway control commands for establishing contexts through media gateways for calls between first and second end users that use the media gateways. At least one media gateway is operatively associated with the media gateway controller for, in response to the commands from the media gateway controller, establishing a call context for a call between first and second end users. The call context includes first and second terminations initialized for bi-directional communications. In response to commands from the media gateway controller, the media gateway establishes a tap context that has at least one tap termination, which refer to one of the first and second terminations. The at least one tap termination receives the media stream of the mouth, the ear, or a mix of mouth and ear from one of the first and second terminations.

Accordingly, it is an object of the invention to provide a mechanism to permit the lawful intercept of a call while minimizing the increased load on call management resources.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
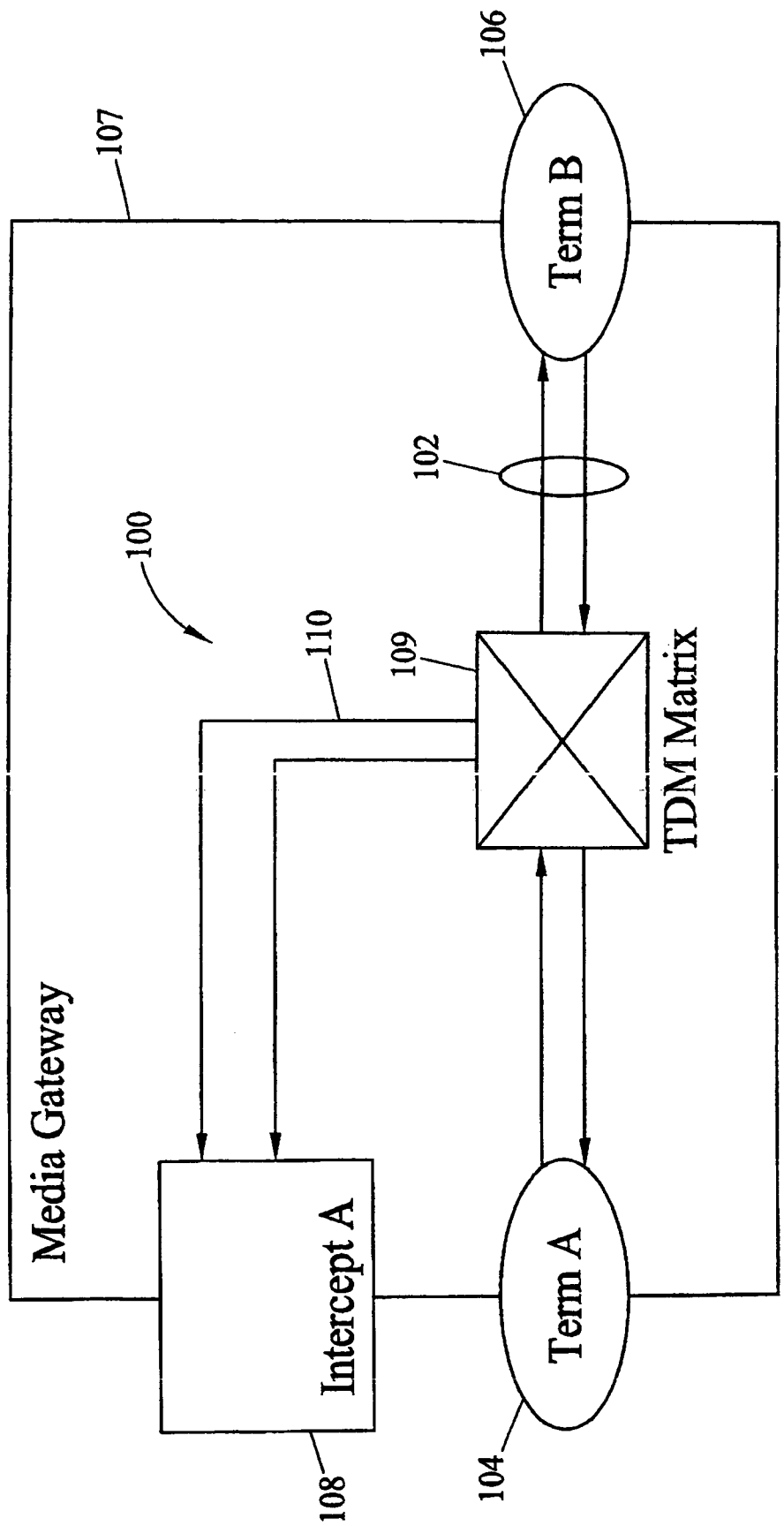
FIG. 1 is a block diagram of a call context having a lawful intercept through a media gateway.
Figure 2:
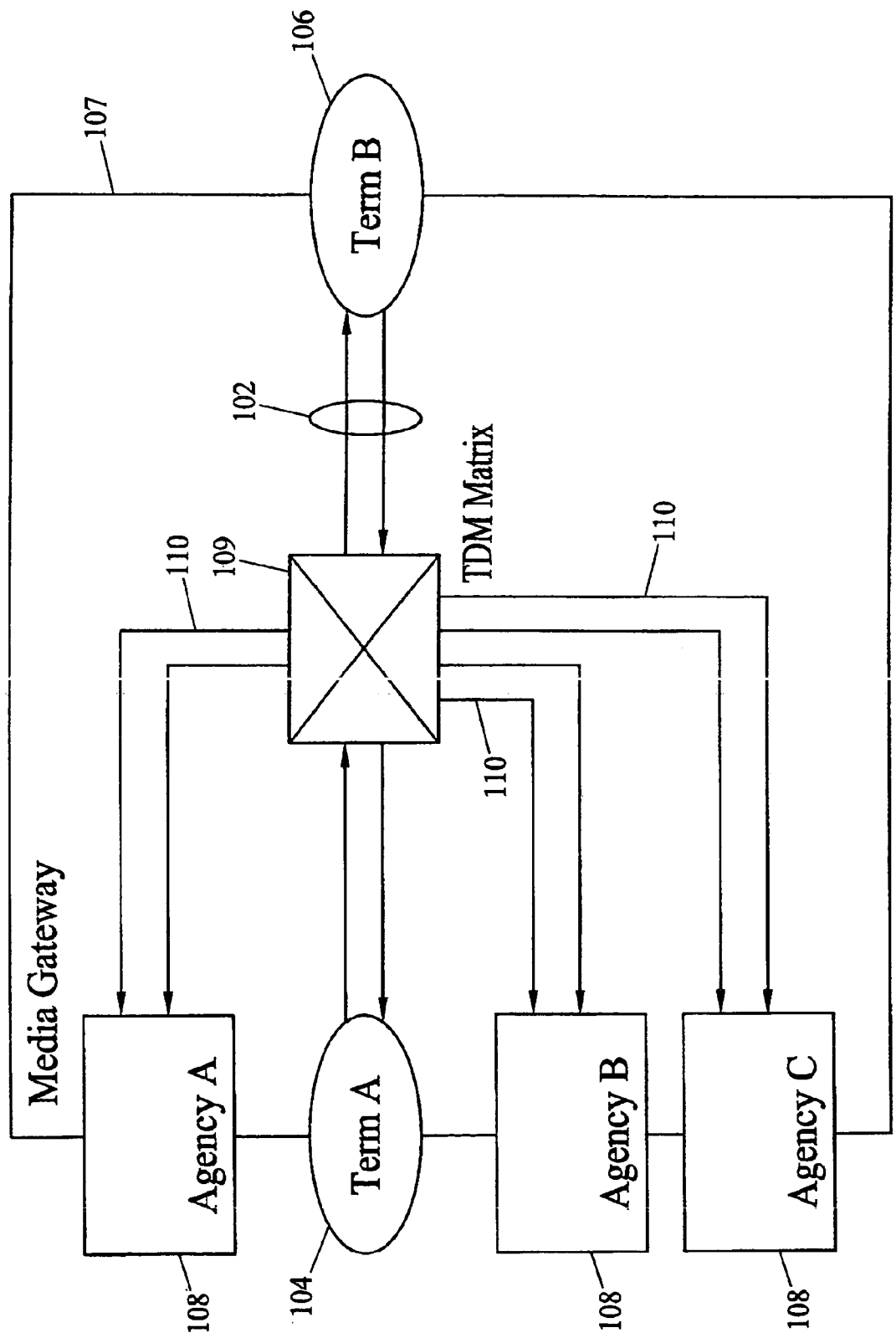
FIG. 2 is a block diagram of a call context having three lawful intercept terminations through a media gateway.
Figure 3:
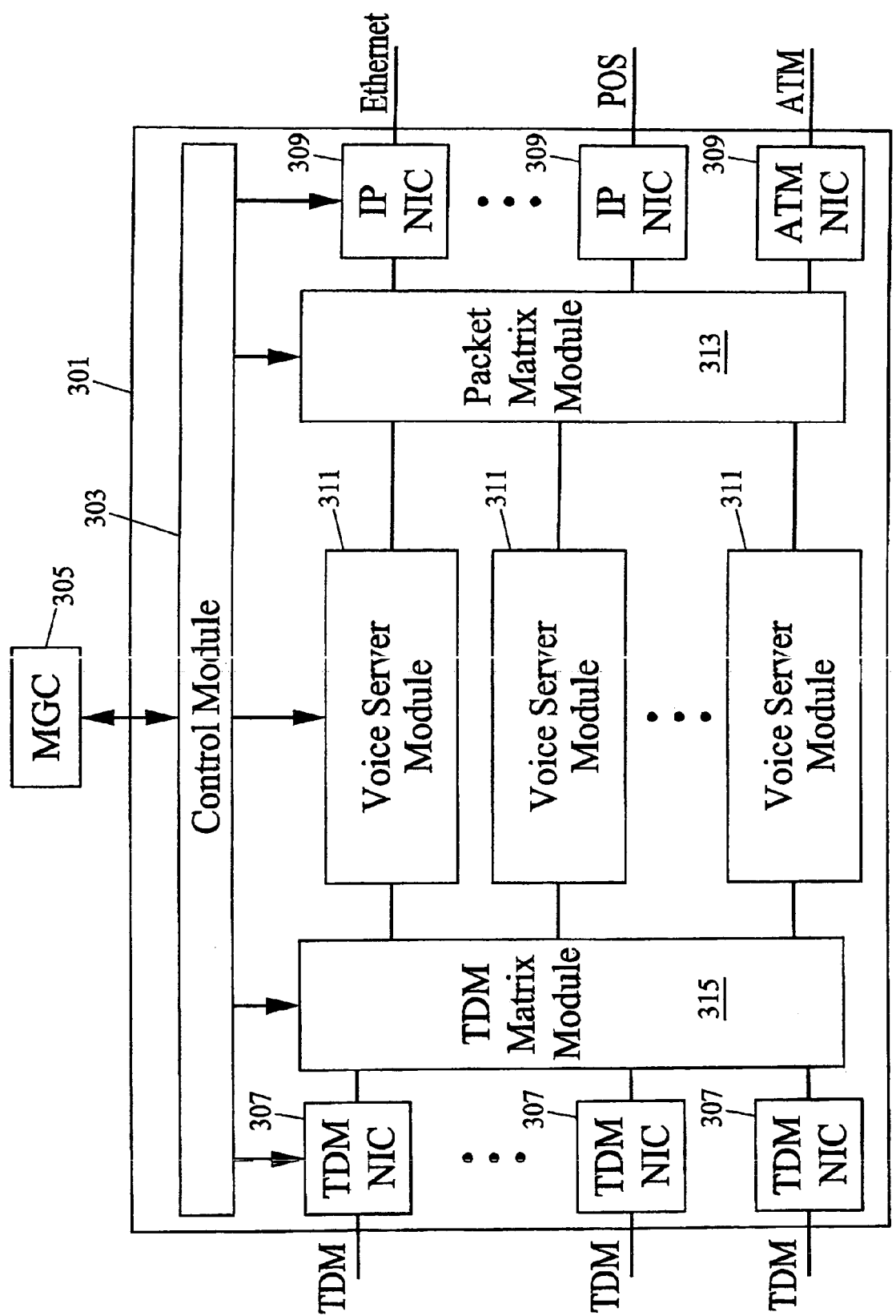
FIG. 3 is a block diagram of a media gateway that may be used to implement an embodiment of the invention.

FIG. 3 is a block diagram of a media gateway 301 that may be used to implement an embodiment of the invention. The media gateway 301 includes a control module 303 that functions as the command interface for a media gateway controller 305. Commands from the media gateway controller 305 are received and processed by the control module 303. The control module 303 may, in turn, provide instructions to or acquire information from other modules within the media gateway 301 in order to comply with the commands from the media gateway controller 305. According to the present invention, the media gateway controller 305 may send commands to the controller 303 to effect lawful intercepts in accordance with the present invention. Exemplary commands and lawful intercept scenarios will be described in detail below.

The media gateway 301 may also include interfaces for sending and receiving media streams to and from a plurality of different types of networks. For example, the media gateway 301 may also include time division multiplexed (TDM) network interface cards (NIC) 307. TDM network interface cards 307 send and receive media streams to and from external TDM networks. TDM network interface cards 307 may implement any suitable physical layer protocol for sending and receiving messages over TDM links. For example, each TDM NIC 307 may terminate one or more TDM voice trunks.

In addition to TDM network interface cards 307, the media gateway 301 may include packet network interface cards 309. Each packet network interface card 309 may implement network layer functions and packet forwarding functions, including Internet protocol (IP) forwarding functions. In the illustrated example, different packet network interface cards are provided to connect to external Ethernet, Packet Over SONET (POS), and asynchronous transfer mode (ATM) networks, multi-protocol label switching (MPLS), frame relay, or any other suitable packet interface.

In FIG. 3, the media gateway 301 includes voice server modules 311, which may include circuitry for implementing one or more voice over packet protocols, such as RTP, AAL1, AAL2, any other suitable voice over packet protocol. In order to switch packets from network interface cards 309 to the appropriate voice server module 311, the media gateway 301 includes a packet matrix module 313. The packet matrix module 313 switches packets under the control of the control module 303. In addition to packet matrix module 313, media gateway 301 includes a TDM matrix module 315 for switching data in TDM time slots between TDM NICs 307 and voice server modules 311. TDM matrix modules 315 are also controlled by control module 303.

In the lawful intercept scenarios described below, the media gateway may be similar in structure to the media gateway 301 illustrated in FIG. 3. However, the present invention is not limited to performing the lawful intercept routines described herein using a media gateway structure identical to that illustrated in FIG. 3. Any suitable media gateway capable of receiving commands from an internal or external media gateway controller and establishing independent tap contexts for lawful intercepts based on the commands is intended to be within the scope of the invention.

Figure 4:
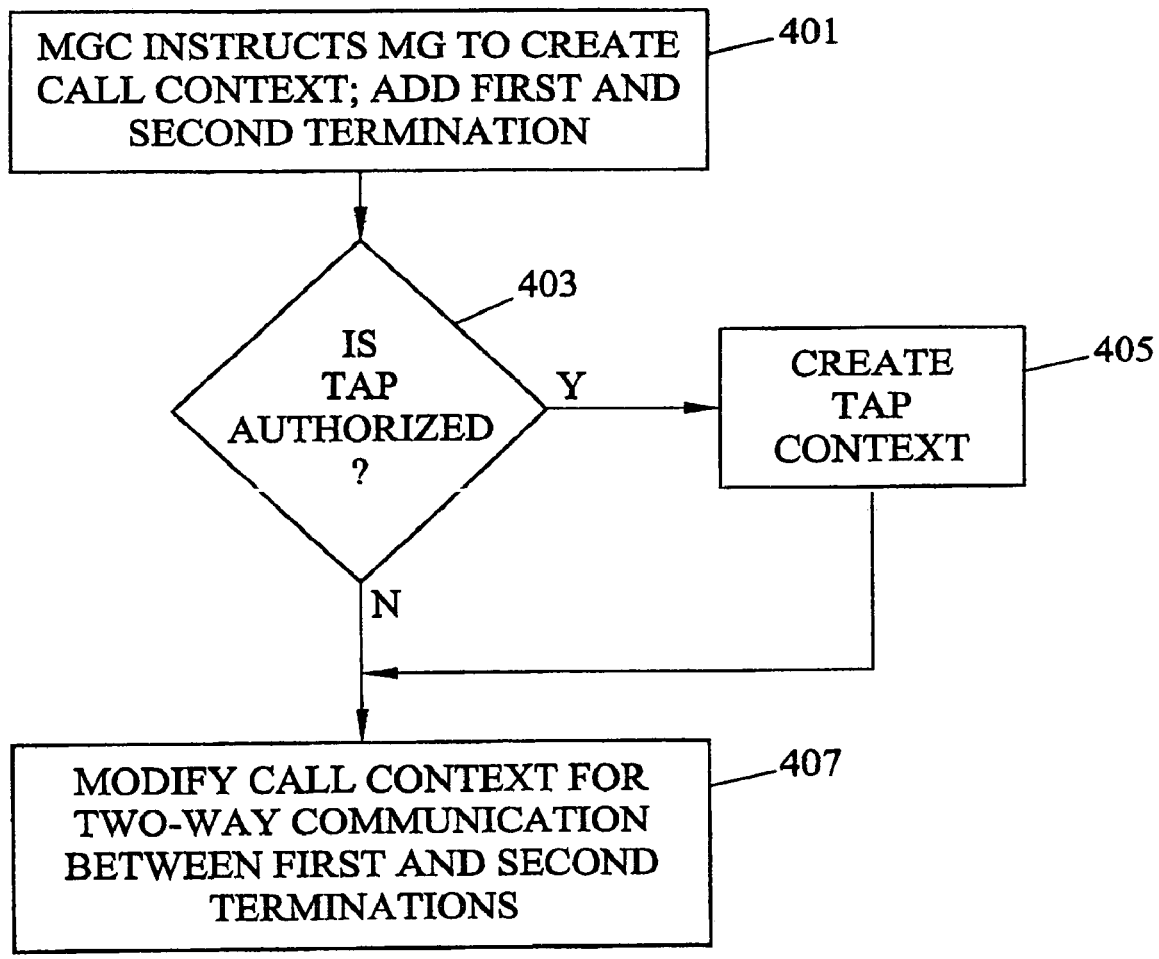
FIG. 4 is a flow diagram of a method of providing lawful intercept in a media gateway controller in accordance with the invention.

FIG. 4 is a flow diagram of exemplary control logic for a media gateway controller for providing lawful intercept in a media gateway in accordance with the invention. A media gateway controller sending appropriate messages to one or more media gateways may perform the steps involved in the lawful intercept procedure. The lawful intercept procedure may be performed during the set-up phase of the call, although law enforcement intercepts (taps) may be added or removed at any time during the call.

In step 401, a media gateway controller (MGC) instructs a media gateway (MG) to create a call context that includes a first termination and a second termination. The MGC may send this instruction as part of the initial call set-up between the first and second terminations or when adding additional terminations to an existing call to support, for example, a three-way call or a multi-party teleconference.

In step 403, the MGC determines if either the first or second termination is the target of a lawful intercept by consulting, for example, a database of court-authorized wiretaps. Such a database would likely include a unique identifier, such as a telephone number, of the party being tapped and a reference to the law enforcement agency or agencies authorized to receive the tapped media stream.

If one or more taps are authorized, the MGC instructs the MG to create a tap context for each authorized tap (step 405). In accordance with the invention, the tap context includes one or two law enforcement (or tap) terminations that contain information referring to a target termination. Media streams in the tap context are defined as one-way from the target termination to the tap termination. Separate media streams may originate from the ear (i.e., the media stream received by the target termination in the call context) and the mouth (i.e., the media stream originated by the target termination in the call context) of the target termination, or these media streams may be combined by a summing circuit and delivered to the tap termination as a single stream.

According to an important aspect of the invention, tap contexts may be created, modified, and released independently from the call context and independently from each other. By "independently," it is meant that tap contexts can be created and released without requiring changes to the topologies of the call context or the other tap contexts. This independence of tap contexts greatly reduces the administrative load and complexity on a media gateway controller and media gateway used to perform the tapping, especially when multiple tap contexts from different law enforcement agencies are used to monitor the same call. Exemplary extensions to the MEGACO protocol for establishing, terminating, and releasing independent tap contexts will be described in more detail below.

Step 407 completes the set-up of the call context by enabling send and received data streams between the first and second terminations. The timing of the execution of this step is independent of the creation of the tap context (step 405). Thus, the first and second terminations may have initiated two-way communication before the tap context has been completely established.

Figure 5:
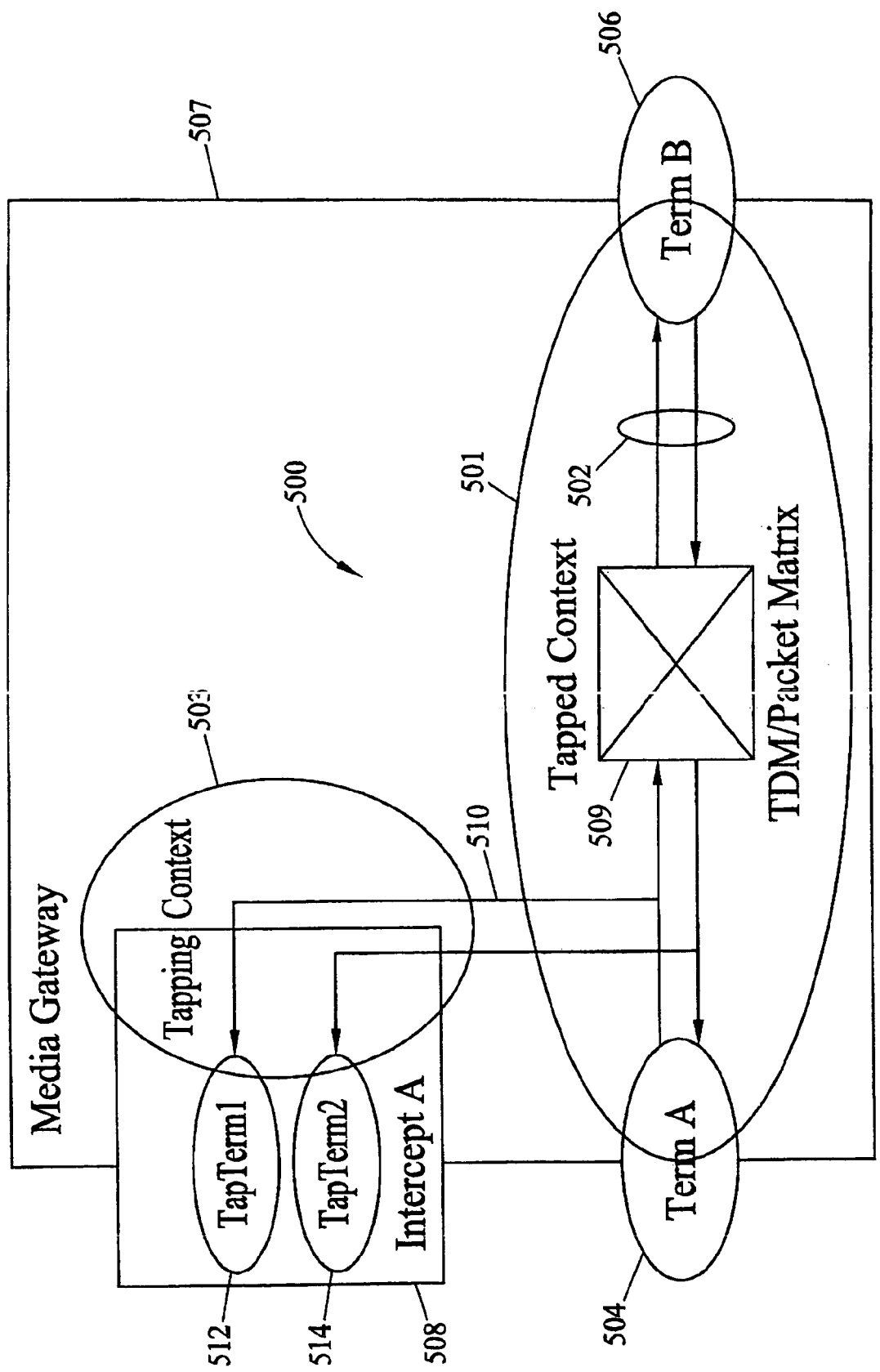
FIG. 5 is a block diagram of a call context having a lawful intercept through a media gateway in accordance with the invention.

FIG. 5 is a block diagram of a call context 500 having a lawful intercept through a media gateway 507 in accordance with the invention. In FIG. 5, the call context 500 includes a tapped context 501 and a tapping context 503. The tapped context 501 includes a bidirectional media stream 502 between Termination A 504 and Termination B 506 in a media gateway 507. The media stream 502 carries media traffic between Termination A 504 and Termination B 506 and allows end users to communicate normally. A TDM/Packet matrix 509 switches the media stream 502 between the terminations.

Intercept A 508 is added to the context to accommodate authorized monitoring of the media stream 502 by law enforcement. Intercept A 508 includes at least one tap termination 512, 514. More specifically, FIG. 5 shows Intercept A 508 including TapTerm1 512 and TapTerm2 514. It is desirable for the media stream 510 toward the at least one tap termination 512, 514 of Intercept A 508 to be one-way to prevent sound that might lead to the detection of Intercept A 508 from being received by the other terminations. Thus, the media stream 510 of the tapping context 503 toward the at least one tap termination 512, 514 of Intercept A 508 is configured as a one way only stream to allow law enforcement to monitor the call without interference. As will be explained in greater detail below, the tap context contains the identity of the termination to be tapped (i.e., Termination A 504) and a tapping mode. The tapping mode may be defined as mouth, ear, or mouth and ear. If the tapping mode is mouth, the tap termination receives a media stream that corresponds to the mouth portion of the tapped user's call. If the tapping mode is ear, the tap termination receives a media stream that corresponds to the ear portion of the tapped user's call. If the tapping mode is ear and mouth, the tap termination receives a mixed media stream that corresponds to the mouth and ear of the tapped user's call. In FIG. 5, the tapping context 503 includes two media streams 510 from Termination A 504 to TapTerm1 512 and TapTerm2 514 of Intercept A 508. One of these streams carries the mouth portion of the call and the other carries the ear portion of the call. As one would appreciate, if the selected tapping mode was mouth and ear, only one media stream 510 would be established between Termination A 504 and Intercept A 508. Similarly, the tapping agent may only be interested in a portion of the call and may set the tapping mode to either mouth or ear to monitor the portion of interest. In this case, only one media stream 510 would be established between Termination A 504 and a tap termination of Intercept A 508 as well.

Figure 6:
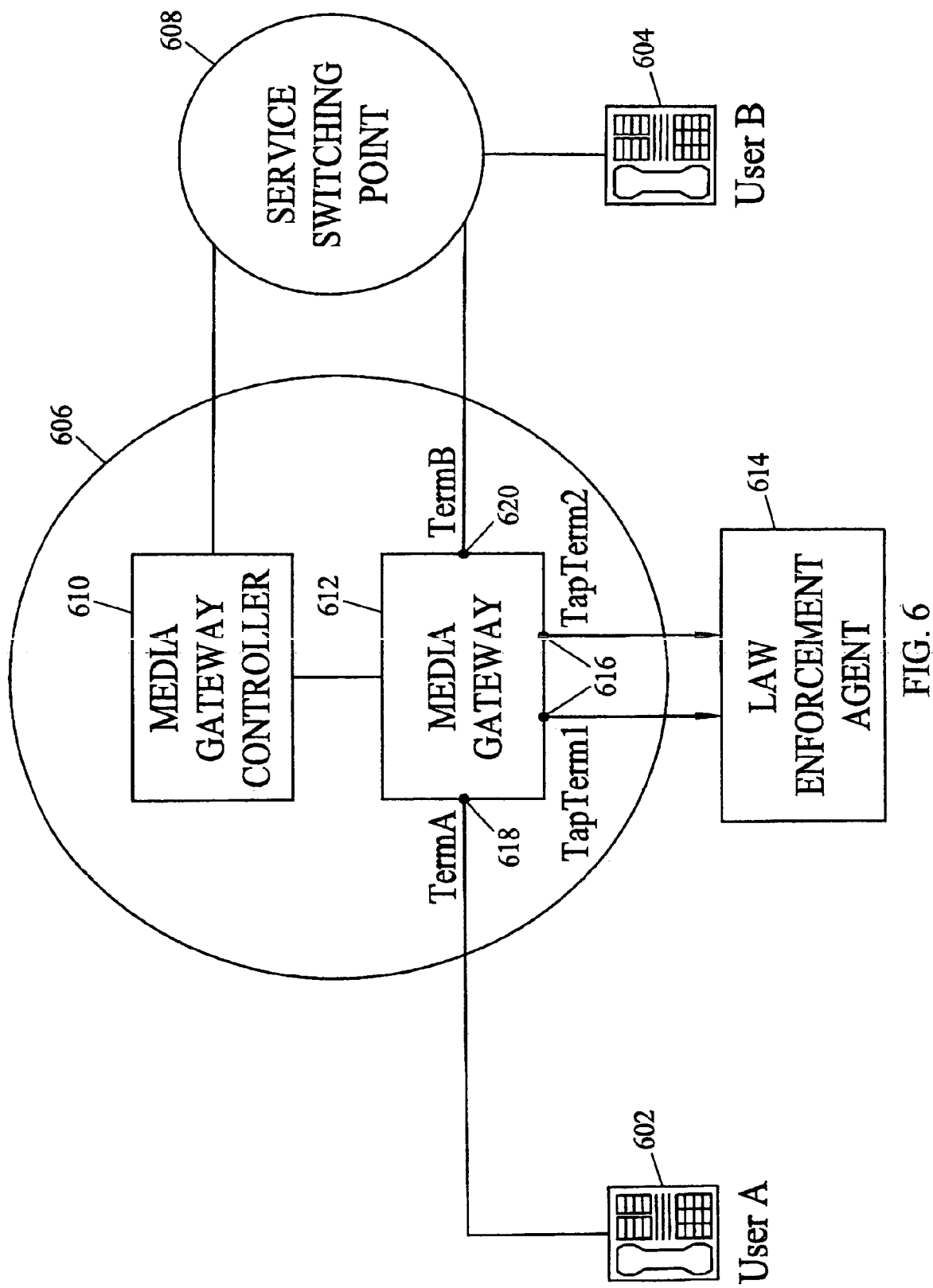
FIG. 6 is a diagram of a communication network implementation of lawful call intercept using independent tap contexts in accordance with the invention.

FIG. 6 is a diagram of a communication network implementation of lawful call intercept using separate associated contexts in accordance with the invention. The exemplary network 600 may be used to transport a call between User A 602 and User B 604. User A 602 is connected to the network through a service switching point (SSP) 606 or an equivalent entity. Similarly, User B 604 is connected to the network through SSP 608. In a conventional network, SSPs perform various functions, including originating, terminating, and switching calls. In an exemplary embodiment, SSP 606 may comprise media gateway controller (MGC) 610 and media gateway (MG) 612. Signaling information is transmitted from User A 602 to MG 612, and forwarded by MG 612 to MGC 610 for processing. Depending on the particular signaling information received, the MGC 610 may forward the information to a destination SSP, such as SSP 608, or instruct MG 612 to perform some function, such as modifying a context of a voice connection between User A 602 and User B 604. Using the procedure described below, the MGC 610 may also instruct the MG 612 to create a tap context that includes a law enforcement agent 614. To ensure that the law enforcement agent 614 can monitor all of the calls made and received by User A 602, tap terminations 616 should be configured on the same SSP 606 as User A 602. Thus, in FIG. 6, User A 602 is connected to Termination A 618 of MG 612. Termination B 620 terminates a trunk from SSP 608. MG 612 also includes two tap terminations 616 for law enforcement agent 614.

Figure 7:
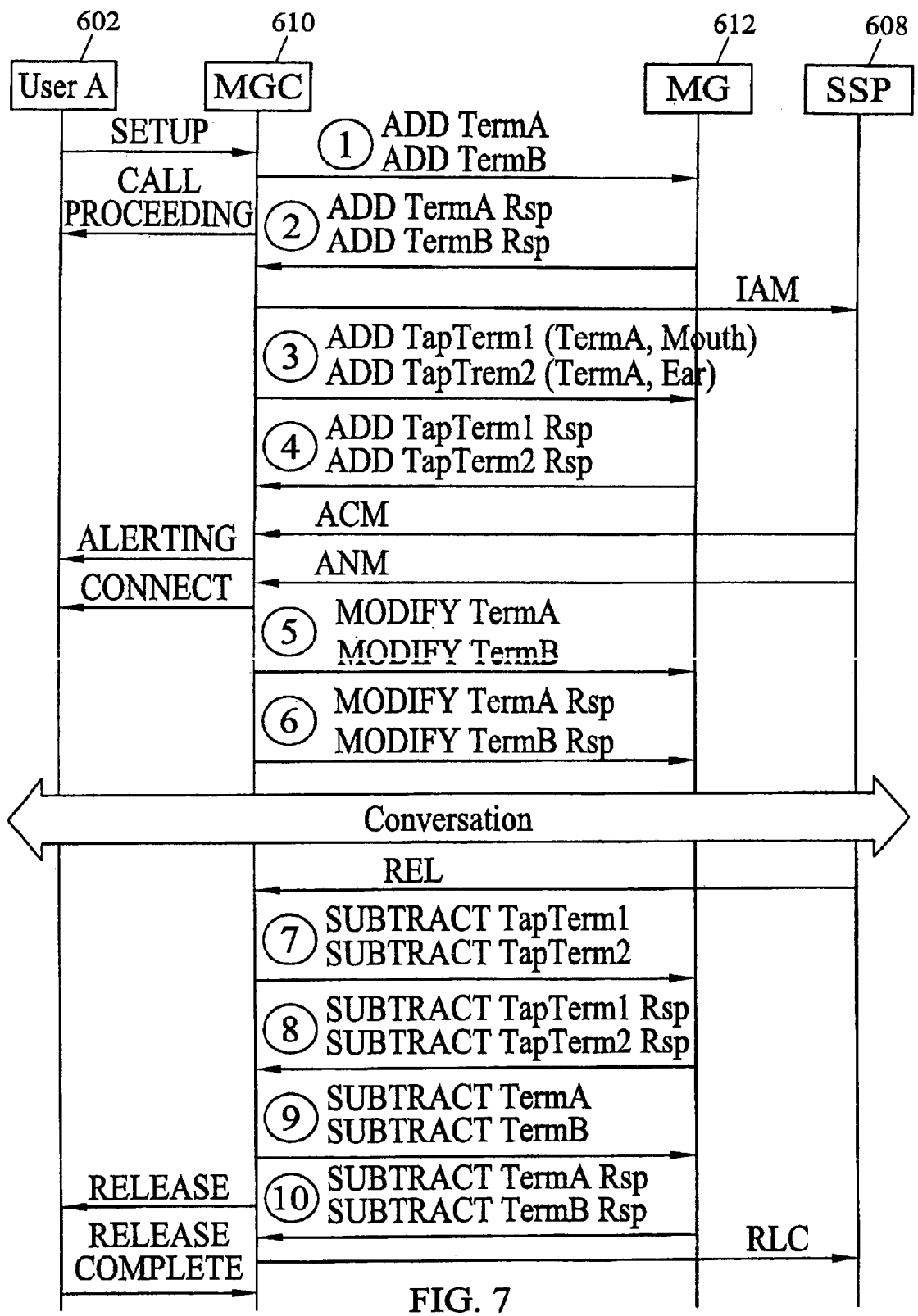
FIG. 7 is a message flow diagram of an exemplary embodiment of lawful call intercept using independent tap contexts in accordance with the invention.

FIG. 7 is a message flow diagram of an exemplary embodiment of lawful call intercept using independent tap contexts in accordance with the invention. The diagram depicts a simplified message flow for a call setup sequence using the ITU-T Recommendation Q.931 and ISUP protocols. One skilled in the art would recognize that the exemplary embodiment of the invention may be adapted for use with other equivalent signaling protocols, such as SIP, SIP-T, BICC, H.323, MGCP, MEGACO etc. In the description that follows, network elements are referred to using the same reference numerals used in FIG. 6. These references are made to assist in the understanding of the exemplary embodiment of the invention and not to limit the invention to any particular network configuration.

In FIG. 7, User A 602 initiates a call to User B 604 by dialing the phone number of User B 604. The phone number is received at the SSP 606 serving User A 602 and an initial address message (IAM) is sent from the SSP 606 to the MGC 610. The MGC 610 responds by instructing the MG 612 to create a call context with User A 602 and User B 604 as terminations (step 1). It should be appreciated that in FIG. 7, the termination descriptors have been simplified to indicate "TermA" or "TermB", rather than using the termination descriptors defined in the MEGACO standard, in an attempt to simplify the message flow diagram. Once the MGC 610 receives an acknowledgement from the MG 612 (step 2), the MGC 610 forwards the IAM to the SSP 608 servicing User B 604.

The MGC 610 determines whether User A 602 is the target of lawful surveillance. This determination may be made in a number of ways, such as by consulting an internal database or by querying one or more government databases that contain lists of surveillance targets. If the MGC 610 determines that User A 602 is the target of lawful surveillance, the MGC 610 instructs the MG 612 to create a tap context (step 3). It should be appreciated that in FIG. 7, the termination descriptor for the tap terminations has been simplified to indicate "TapTerm" rather than using the termination descriptors defined in the MEGACO standard. The tap context includes one-way media streams from the intercept target (i.e., User A 602) to the law enforcement terminations 614. The ear and mouth of User A 602 may be sent to the law enforcement terminations 614 as separate media streams (indicated as "TapTerm/Mouth" and "TapTerm/Ear" in step 3 of FIG. 6) or may be combined into a single stream using a summing circuit (not shown). Although FIG. 7 shows the creation of a single tap context, multiple tap contexts may be created in a similar fashion to support surveillance by more than one law enforcement agency. The MG 612 indicates the creation of the tap contexts with a response message (step 4).

The ability to create an individual tap context that refers to an intercept target termination within an existing call context is a new feature provided by the present invention. In FIG. 7, the ADD commands in steps 3 and 4 allow the MGC to specify two tap terminations and tapping modes. In response to these commands, the media gateway establishes one-way media streams to the specified tap terminations. Three tapping modes are presently defined: "mouth," "ear," and "mouth and ear." If the tapping mode is "mouth," then the tap termination receives the media stream corresponding to the mouth of (i.e., originating from) the tapped user. If the tapping mode is "ear," then the tap termination receives the media stream corresponding to the ear of (i.e., received by) the tapped user. If the tapping mode is "mouth and ear," then the tap termination receives a mixed media stream corresponding to the mouth and ear of the tapped user. The ADD commands in steps 3 and 4 provide separate mouth and ear media streams, which are shown in FIG. 6 as "TapTerm1" and "TapTerm2". The ability to specify separate tapping modes allows law enforcement agencies to identify the originator of portions of a conversation.

The steps taken by the MGC 610 and MG 612 in creating the tap context are independent of the SS7 call processing and of the steps taken within MG 612 to establish the call context. That is, while MGC 610 and MG 612 perform the steps needed to create the tap context, the SSP 608 serving User B 604 performs the steps needed to complete the connection of the call from User A 602. For example, when the SSP 608 receives the IAM from the MGC 610, the SSP 608 confirms that it is serving User B 604 and that User B 604 is idle. The SSP 608 formulates an address complete message (ACM), which indicates that the IAM has reached its proper destination and transmits this message back through MGC 610 to the SSP 606 serving User A 602. At the same time, the SSP 608 sends a ring tone to User B 604. When User B 604 answers, the SSP 608 sends an answer message (ANM) to the MGC 610. The MGC 610 forwards the ANM to the SSP 606 serving User A 602. The MGC 610 also instructs the MG 612 to modify the call context between User A 602 and User B 604 to permit two-way communication (steps 5 and 6).

In FIG. 7, User B 604 ends the conversation by hanging up. The SSP 608 sends a release message (REL) to the MGC 610. The MGC 610 instructs the MG 612 to remove the tap context (steps 7 and 8) and then remove the call context (step 9). The MGC 610 also sends the RELEASE to User A 602. When the MGC 610 receives the response from the MG 612 indicating that the call context has been removed, the MGC 610 sends a release complete message (RLC) to the SSP 608.

Thus, the present invention includes methods and systems for providing for the lawful intercept of a media stream in a media gateway. The methods and systems include the independent creation of a tap context with one or two law enforcement terminations that refer to a target termination. The tap context provides for a one-way media stream from the target termination to the law enforcement termination. The tap context also provides for per-port tapping, which permits separate media streams to be created from the ear port and the mouth port of the target termination. Per-port tapping permits law enforcement to easily determine which portions of a conversation are attributable to each party of the call.

The present invention further provides for the creation of multiple tapping contexts to support tapping by multiple law enforcement agencies. Each of the tapping contexts can be created, modified, and released independently, thereby alleviating the need to reconfigure the call context to accommodate the creation or release of a tap termination.

The invention has been described with respect to an exemplary embodiment, which is intended to be illustrative, not restrictive. In light of this disclosure, those skilled in the art will likely make alternate embodiments of this invention. These and other alternate embodiments are intended to fall within the scope of the claims that follow.

What is claimed is:

1. A method for providing lawful intercept of a media stream in a media gateway, the method comprising:
   (a) establishing a call context between a first termination in the media gateway and a second termination in the media gateway, the call context defining a call media stream between the first and second terminations associated with a call between first and second end users; and
   (b) establishing, independently from the call context, a first tap context between the first termination and at least one first tap termination in the media gateway, the first tap context defining a one-way tap media stream from the first termination to the at least one first tap termination, the tap media stream carrying a portion of the call media stream from the first termination to the at least one first tap termination.

2. The method of claim 1, comprising establishing a plurality of second tap contexts between the first termination and a plurality of second tap terminations.

3. The method of claim 2, wherein establishing a plurality of second tap terminations includes establishing the second tap terminations independently from the at least one first tap termination and from each other.

4. The method of claim 1, wherein the first tap context includes a first tap media stream carrying an ear portion of the call media stream from the first termination to the at least one first tap termination and a second tap media stream carrying a mouth portion of the call media stream from the first termination to the at least one first tap termination.

5. The method of claim 1, wherein the first tap context includes a tap media stream from the first termination to the at least one first tap termination, wherein an ear portion of the call media stream and a mouth portion of the call media stream are combined in the tap media stream.

6. The method of claim 1, wherein the first tap context includes a tap media stream from the first termination to the at least one first tap termination, wherein the tap media stream carries the mouth portion of the call media stream.

7. The method of claim 1, wherein the first tap context includes a tap media stream from the first termination to the at least one first tap termination, wherein the tap media stream carries the ear portion of the call media stream.

8. The method of claim 1, comprising prior to establishing the first tap context, confirming that the first tap context is legally authorized.

9. The method of claim 1, comprising, after establishing the first tap context, modifying the call context such that the media stream between the first termination and the second termination is bi-directional.

10. The method of claim 1, wherein establishing the first tap context between the first termination and the first tap termination includes sending a command from a media gateway controller to the media gateway instructing the media gateway to create a new context, the new context including a one-way media stream from the first termination to the first tap termination.

11. The method of claim 4, wherein establishing the first tap context between the first termination and the first tap termination includes sending a command from a media gateway controller to the media gateway instructing the media gateway to create a new context, the new context including the first media stream carrying the mouth portion of the call media stream from the first termination to the first tap termination and the second media stream carrying the ear portion of the call media stream from the first termination to the first tap termination, the first and second media streams being configured as one-way streams.

12. A method for providing lawful intercept of a media stream in a media gateway, the method comprising:
(a) establishing a call context between a first termination and a second termination, the call context defining a call media stream between the first and second terminations associated with a call between first and second end users; and
(b) establishing a first tap context between the first termination and at least one first tap termination, the first tap context defining a one-way tap media stream from the first termination to the at least one first tap termination, the tap media stream carrying a portion of the call media stream from the first termination to the at least one first tap termination, wherein the first tap context includes a first tap media stream carrying an ear portion of the call media stream from the first termination to the at least one first tap termination and a second tap media stream carrying a mouth portion of the call media stream from the first termination to the at least one first tap termination, wherein establishing the first tap context between the first termination and the first tap termination includes sending a command from a media gateway controller to the media gateway instructing the media gateway to create a new context, the new context including the first media stream carrying the mouth portion of the call media stream from the first termination to the first tap termination and the second media stream carrying the ear portion of the call media stream from the first termination to the first tap termination, the first and second media streams being configured as one-way streams, wherein the command from the media gateway controller to the media gateway instructing the media gateway to create the new context identifies at least one tap termination, identifies the first termination as a media source, and indicates a tapping mode.

13. The method of claim 12, wherein the tapping mode is one of ear, mouth, and ear and mouth.

14. A media gateway with lawful intercept capability, the media gateway comprising:
(a) a plurality of network interfaces for sending and receiving media streams to and from external networks;
(b) a plurality of voice processing resources operatively associated with the network interfaces for processing the media streams received from the external networks; and
(c) a controller operatively associated with the network interfaces and the voice processing resources for controlling the network interfaces and the voice processing resources to establish a call context in the media gateway for a call between first and second end users, the call context including first and second terminations in the media gateway, and, in response to a request for a lawful intercept of the call, for creating, independently from the call context a tap context, the tap context including one of the first and second terminations and at least one tap termination in the media gateway.

15. The media gateway of claim 14, wherein the network interfaces include packet network interfaces for sending and receiving packetized voice.

16. The media gateway of claim 15, wherein the packet network interfaces include at least one of ATM, Ethernet, POS, and MPLS interfaces.

17. The media gateway of claim 15, wherein the packet network interfaces send and receive packetized voice using at least one of AAL1, AAL2, and VoIP protocols.

18. The media gateway of claim 14, wherein the network interfaces include TDM network interfaces for sending and receiving TDM-encoded voice.

19. The media gateway of claim 14, wherein the network interfaces include packet network interfaces for sending and receiving packetized voice and TDM interfaces for sending and receiving TDM-encoded voice.

20. The media gateway of claim 19, wherein the packet network interfaces include at least one of ATM, Ethernet, POS, and MPLS interfaces.

21. The media gateway of claim 19, wherein the packet network interfaces send and receive packetized voice using at least one of AAL1, AAL2, and VoIP protocols.

22. The media gateway of claim 14, wherein at least one of the first and second terminations comprises a packet network interface and the tap termination comprises a TDM network interface.

23. The media gateway of claim 14, wherein each of the first termination, the second termination, and the tap termination have one of a TDM interface and a packet-based interface.

24. A system for providing lawful intercept of a media stream in one or more media gateways, the system comprising:
(a) a media gateway controller for generating media gateway control commands for establishing contexts through media gateways for calls between first and second end users that use the media gateways; and
(b) a media gateway operatively associated with the media gateway controller for, in response to the commands from the media gateway controller, establishing a call context for a call between first and second end users, the call context including first and second terminations in the media gateway being initialized for bi-directional communications, and for, in response to commands from the media gateway controller, establishing, independently from the call context, a tap context including at least one tap termination in the media gateway and at least one of the first and second terminations, the at least one tap termination referring to one of the first and the second termination and having one-way media steams from the one of the first and second termination to the at least one tap termination.

25. The system of claim 24, wherein the media gateway controller is adapted to control the media gateway to perform the lawful intercept of the media stream using extensions to a media gateway control protocol.

26. The system of claim 25, wherein the extensions include a command for intercepting at least a portion of a media stream defined in an existing context within the same media gateway.

27. The system of claim 24, wherein the at least one media gateway includes packet interfaces for sending and receiving packetized media stream communications.

28. The system of claim 24, wherein the at least one media gateway includes TDM interfaces for sending and receiving TDM-encoded media information.

29. The system of claim 24, wherein the media gateway includes packet interfaces for sending and receiving packetized media streams and TDM interfaces for sending and receiving TDM-encoded media streams.

30. The system of claim 24, wherein the media gateway controller and the at least one media gateway are located on the same physical platform.

31. The system of claim 24, wherein the media gateway controller and the at least one media gateway are located on separate physical platforms.

32. The method of claim 1 wherein the tap context is creatable, modifiable, and releasable independently from the call context.

33. The media gateway of claim 14 wherein the tap context is creatable, modifiable, and releasable independently from the call context.

34. The system of claim 24 wherein the tap context is creatable, modifiable, and releasable independently from the call context.

* * * * *